April 26, 1938.  J. BERNSTEIN  2,115,248
TRANSPORT TANK MOUNTING
Filed Nov. 10, 1936
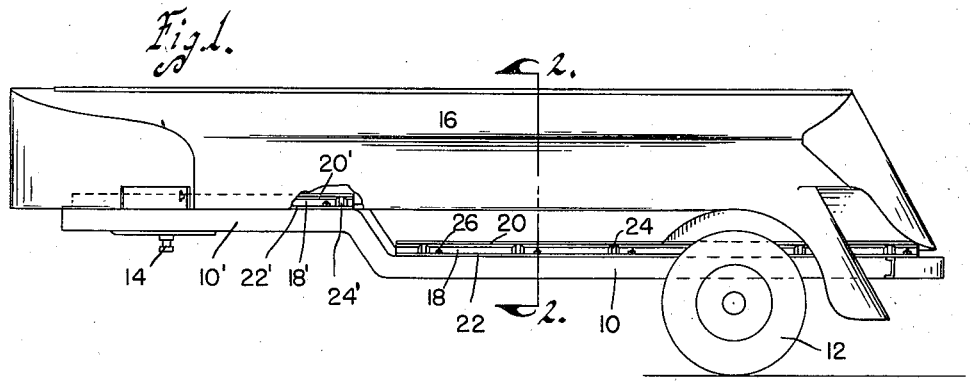
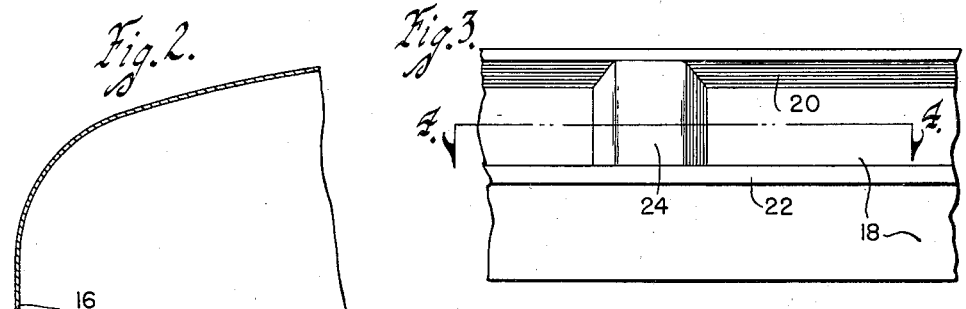
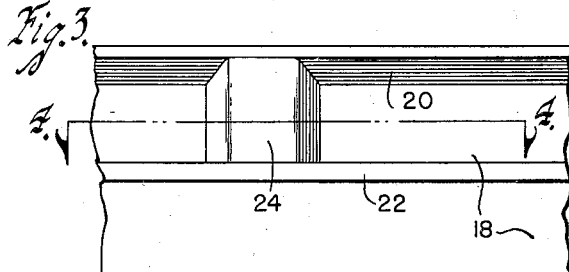
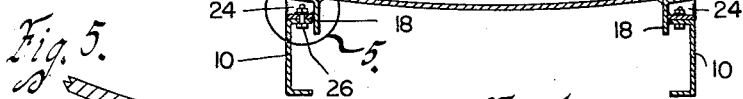
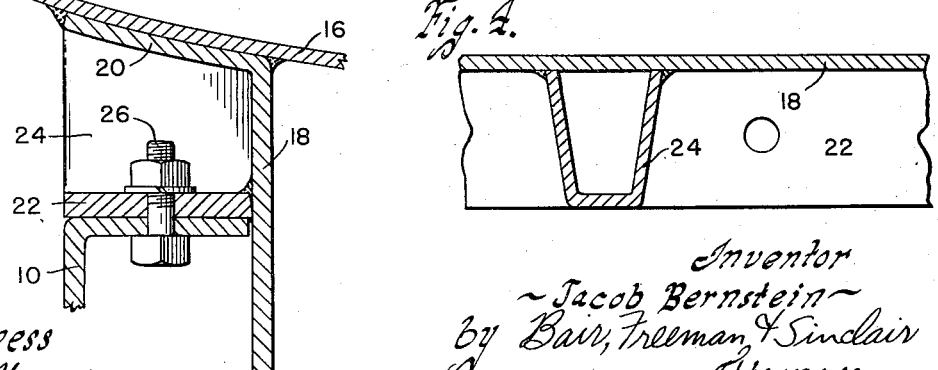
Inventor
Jacob Bernstein
by Bair, Freeman, & Sinclair
Attorneys
Witness
H. S. Munzenmaier Patented Apr. 26, 1938

2,115,248

UNITED STATES PATENT OFFICE 2,115,248

TRANSPORT TANK MOUNTING

Jacob Bernstein, Omaha, Nebr.

Application November 10, 1936, Serial No. 110,103

6 Claims. (Cl. 280—5)

An object of my invention is to provide a transport tank mounting of simple, durable and inexpensive construction.

A further object is to provide a practical construction for mounting a transport tank, such as the one shown in my co-pending application, Serial Number 86,331, filed June 20, 1936, on a vehicle chassis.

Still a further object is to provide a mounting in the form of positioning flanges which reinforce the tank at the point of support, and supporting flanges which are connected with the tops of frame members of a vehicle chassis, the positioning flanges being interposed between the frame members to eliminate any lateral shifting of the tank relative to the chassis.

A further object is to provide a mounting means which includes gusset flanges for further reinforcing the mounting means to eliminate any collapse thereof when the tank is filled.

With these and other objects in view, my invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of a transport tank showing my mounting means associated therewith.

Figure 2 is an enlarged sectional view on the line 2—2 of Figure 1.

Figure 3 is an enlarged side elevation of a portion of the mounting means.

Figure 4 is a sectional view on the line 4—4 of Figure 3; and

Figure 5 is an enlarged sectional view of the portion of Figure 2 within the circle 5 to show the construction in greater detail.

On the accompanying drawing I have used the reference numeral 10 to indicate a chassis frame member. Two of the members 10 are provided and they are spaced from each other as shown in Figure 2. The rear ends of the frame members are supported by wheels 12 while the front ends thereof are arranged at a higher elevation as indicated at 10' and are provided with a king pin 14 for connection with a truck tractor.

The transport tank is indicated by the reference numeral 16 and this may be of any cross sectional shape desired, the shape disclosed in my co-pending application being illustrated.

My mounting means includes positioning flanges 18 secured longitudinally to the bottom of the tank 16 and these may be flanges of angles, the other flanges of which are indicated at 20. The flanges 20 are secured to the tank bottom preferably by welding. Supporting flanges 22 are secured to the positioning flanges 18 and extend laterally therefrom. These are located above the lower edges of the positioning flanges 18 and are preferably welded to the flanges 18.

Gusset flanges 24 are welded between the flanges 20 and 22 and located at spaced points as illustrated in Figure 1. These are formed of plate material bent U-shape as shown in Figure 4, with their open ends against the positioning flanges 18. By locating the flanges 22 above the lower edges of the flanges 18, the flanges 18 may be positioned between the chassis frame members 10 and will thus eliminate any lateral shifting of the tank 16 relative to the frame members 10.

The arrangement of the parts and assembly is such that the mounting means and the tank are removable as a unit relative to the chassis, and may readily be secured to the chassis as by bolts 26 spaced along the supporting flanges 22 and extending through them and through the upper flanges of the frame members 10.

I provide the elements 18 to 24 for mounting on the frame members 10, while similar members 18' to 24' are mounted on the frame members 10'.

Some changes may be made in the construction and arrangement of the parts of my device without departing from the real spirit and purpose of my invention, and it is my intention to cover by my claims any modified forms of structure or use of mechanical equivalents, which may be reasonably included within their scope.

I claim as my invention:

1. In a transport tank mounting, a pair of angle bars secured longitudinally to a cylindrical tank in spaced relation to each other, supporting flanges secured to the flanges of said angle bars which extend away from said tank, said supporting flanges being positioned on spaced frame members of a vehicle chassis with said flanges of said angle bars extending downwardly below the lower faces of said supporting flanges and terminating below the tops of said frame members for thereby preventing lateral movement of said tank relative to said vehicle chassis and gusset flanges spaced along said angle bars and interposed between said tank and said supporting flanges.

2. In a mounting of the class described, a pair of vertical positioning flanges secured to the bottom of a cylindrical tank in spaced relation and extending longitudinally thereof, a pair of horizontal supporting flanges extending laterally and outwardly from said positioning flanges and spaced above the lower edges thereof and means for securing said supporting flanges to the tops of frame members of a vehicle chassis with said positioning flanges confined between said frame members to prevent lateral movement of said tank relative to said vehicle chassis.

3. In a mounting of the class described, a pair of vertical positioning flanges secured to the bottom of a cylindrical tank in spaced relation and extending longitudinally thereof, a pair of horizontal supporting flanges extending laterally from said positioning flanges and spaced above the lower edges of the positioning flanges, means for securing the supporting flanges to the tops of the frame members of a vehicle chassis and gusset flanges spaced along said positioning flanges and interposed between said tank and said supporting flanges, said gusset flanges being U-shaped in cross section with the open side of the U against said positioning flanges.

4. In a mounting of the class described, a pair of vertical flanges secured to the bottom of a cylindrical tank in spaced relation and extending longitudinally thereof, a pair of horizontal supporting flanges extending laterally from said vertical flanges, said supporting flanges being positioned on spaced frame members of a vehicle chassis, flanges depending from said supporting flanges and terminating below the tops of said members, and gusset flanges spaced along said supporting flanges and interposed between said tank and said supporting flanges.

5. In a mounting of the class described, a pair of vertical flanges secured to the bottom of a cylindrical tank in spaced relation and extending longitudinally thereof, a pair of horizontal supporting flanges extending laterally from said vertical flanges, said supporting flanges being positioned on spaced frame members of a vehicle chassis, flanges depending from said supporting flange and terminating below the tops of said frame members, and gusset flanges spaced along said supporting flanges and interposed between said tank and said supporting flanges, said gusset flanges being U-shaped in cross section with the open side of the U against said vertical flanges.

6. In a transport tank mounting, a pair of angle bars secured longitudinally to a cylindrical tank in spaced relation to each other, supporting flanges secured to the flanges of said angle bars which extend away from said tank, said supporting flanges being positioned on spaced frame members of a vehicle chassis with said flanges of said angle bars extending downwardly below the lower faces of said supporting flanges and terminating below the tops of said frame members for thereby preventing lateral movement of said tank relative to said vehicle chassis and gusset flanges spaced along said angle bars and interposed between said tank and said supporting flanges, said gusset flanges being U-shaped in cross section with the open side of the U against said flanges of said angle bar.

JACOB BERNSTEIN.